T. H. PATENALL.
RAILWAY SIGNALING SYSTEM.
APPLICATION FILED JULY 27, 1911.
1,060,117.
Patented Apr. 29, 1913.
2 SHEETS—SHEET 1.
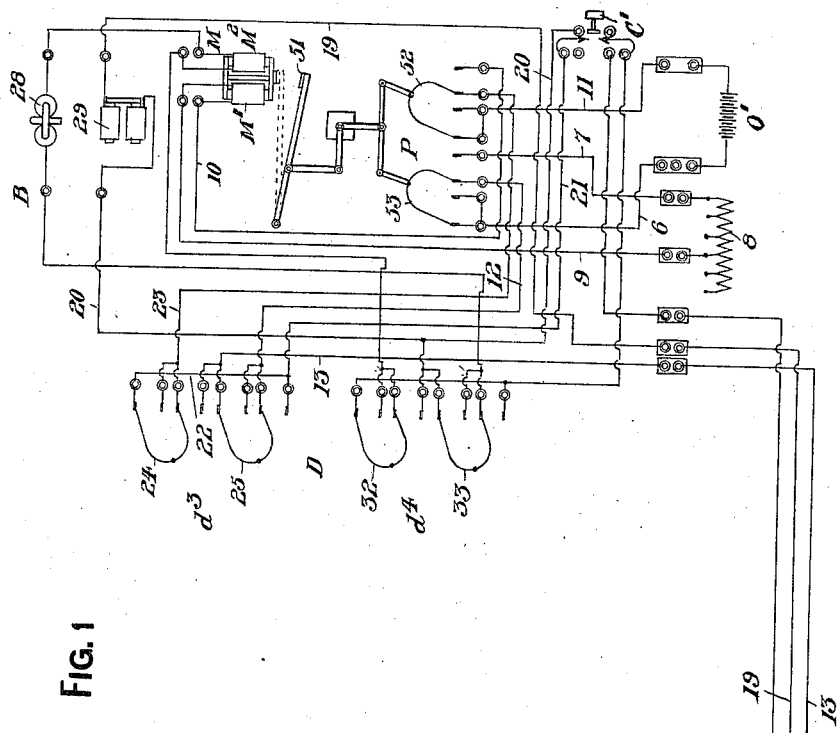
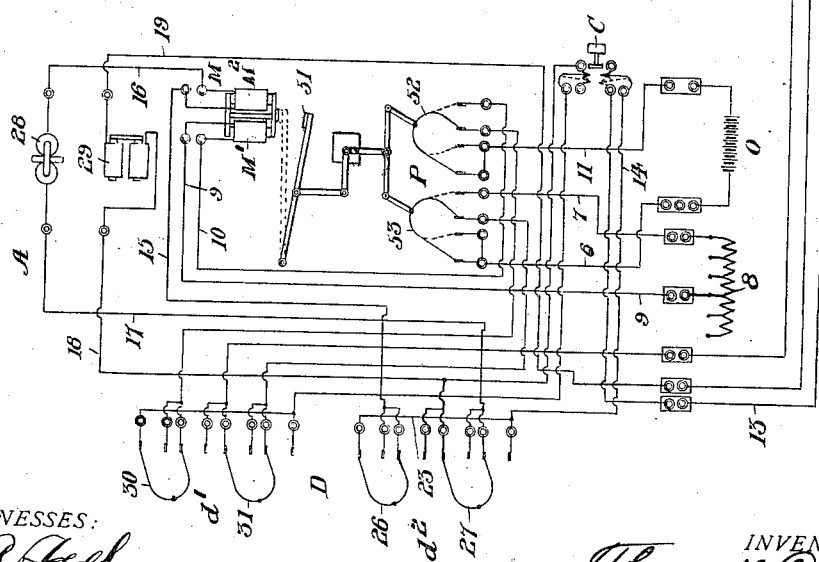
FIG. 1
WITNESSES:
INVENTOR.
Thomas H. Patenall
BY
ATTORNEY.

T. H. PATENALL.
RAILWAY SIGNALING SYSTEM.
APPLICATION FILED JULY 27, 1911.

1,060,117.

Patented Apr. 29, 1913.

2 SHEETS—SHEET 2.

WITNESSES:

INVENTOR.
Thomas H. Patenall
BY
His ATTORNEY.

UNITED STATES PATENT OFFICE.

THOMAS H. PATENALL, OF HOLLIS, NEW YORK, ASSIGNOR TO THE UNION SWITCH & SIGNAL COMPANY, OF SWISSVALE, PENNSYLVANIA, A CORPORATION OF PENNSYLVANIA.

RAILWAY SIGNALING SYSTEM.

1,060,117. Specification of Letters Patent. Patented Apr. 29, 1913.

Application filed July 27, 1911. Serial No. 640,800.

*To all whom it may concern:*

Be it known that I, THOMAS H. PATENALL, a citizen of the United States, residing at Hollis, in the county of Queens and State of New York, have invented certain new and useful Improvements in Railway Signaling Systems, of which the following is a specification.

My invention relates to signaling systems for controlling traffic on railways, especially single track railways, which systems embody apparatus known in the art as "staff instruments."

In the present invention, as in others of a similar nature, a staff instrument is located at each end of the section of track to be protected, the two instruments being connected by appropriate electric circuits so arranged that the mechanism in one instrument can be manipulated to release a staff therefrom only when no staff is out of either of the two instruments.

My present invention relates more particularly to systems embodying such apparatus for which no special operators are required, the circuits being so arranged to control the mechanism that when no staff is out of either of the two instruments, a staff can be released from either instrument without the sanction or coöperation of an operator at the other instrument.

I will describe a system embodying my invention, and then point out the novel features thereof in claims.

Figure 2:
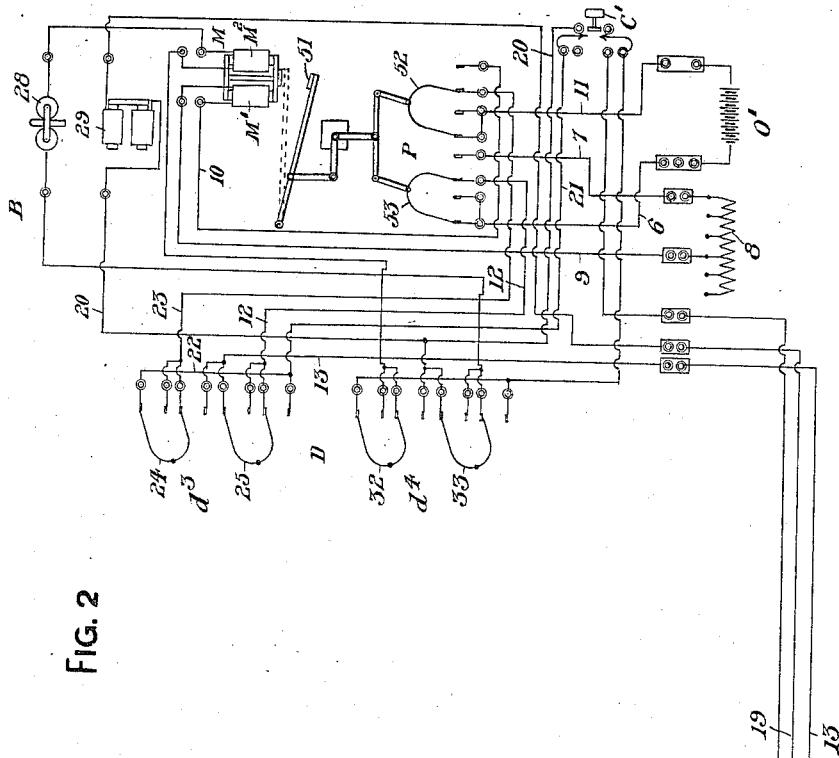
Figure 2:
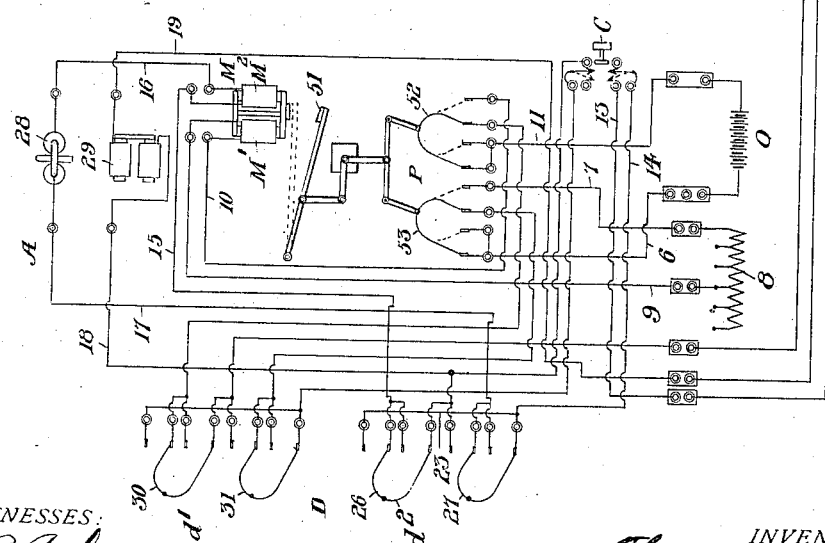

In the accompanying drawings, Figure 1 is a diagrammatic view showing an arrangement of circuits embodying my invention and mechanism controlled thereby, the solid lines indicating the positions of the parts of the instruments when the instruments are in synchronism, that is, when no staff is out of either instrument, and the dash lines indicating the positions of parts in the instruments to permit the removal of a staff from the instrument at "A." Fig. 2 is a similar view showing in solid lines the positions of the parts in the instruments after a staff has been removed from the instrument at "A," and showing in dash lines the positions of parts of the instruments when an attempt is made to release a second staff from the instrument at "A."

The present invention is an improvement on the circuits shown and described in United States Letters Patent No. 794,423 granted to me on July 11, 1905, to which patent reference may be had for one form of the structure and for the functions of the various parts embodied in the system herein described.

Referring to the drawings, M designates a holding magnet the function of which, as explained in Patent No. 794,423 above referred to, is to hold parts of the mechanism in position for the removal of a staff when the magnet is properly energized. This holding magnet comprises two coils $M^1$ and $M^2$ which for convenience I will hereinafter refer to as the local coil and the line coil respectively. As explained in Patent No. 794,423, when current flows through the two coils in opposite directions—that is, in one direction through one of the coils and in the other direction through the other coil—the magnet will hold its armature 51 and will thereby hold the parts of the mechanism in such position that a staff can be removed; when however current flows through the two coils in the same direction, the holding power of the magnet is annulled and the parts of the mechanism are therefore not held in position for removal of a staff. In the present invention, as in the system disclosed in the above-mentioned Patent No. 794,423, the local coil of each instrument is connected in circuit with the battery at the corresponding instrument and current flows through such local coil always in the same direction; and the line coil of each instrument is connected in circuit with the battery at the other instrument, and with a pole-changer at each instrument, so that current flows through such line coil in one direction or the other according to whether or not the two pole-changers are in corresponding positions. In the present invention, however, each instrument comprises two pole-changers, one pole-changer of each instrument being included in circuit with the line coil of one instrument and the remaining two pole-changers being included in circuit with the line coil of the other instrument.

The staff instruments used in my present invention may be similar to those shown and described in my hereinbefore mentioned Patent No. 794,423 except that in the present case each instrument is provided with two pole-changers D instead of one, and the push button of each instrument operates two circuit controllers instead of one. Obviously the bells are omitted from the instruments used with the system of the present invention since the removal of a staff from one instrument does not require the attention of an operator at the other instrument.

Referring now particularly to Fig. 1 of the drawings, and assuming that the two instruments are in synchronism and that it is desired to remove a staff from instrument A, the person who is to operate the instrument presses push button C of that instrument, thereby moving the contacts to the positions indicated by the dash lines, and also manipulates the apparatus in the usual manner to bring armature plate 51 into contact with the magnet M thereby moving circuit controlling contacts 52 and 53 into the positions indicated in dash lines. This movement of contacts 52 and 53 closes a circuit including local coil M' of instrument A and battery O, which circuit is as follows:—from battery O through wire 6, circuit controlling contact 53, wire 7, resistance 8, wire 9, local coil M', wire 10, circuit controlling contact 52, wire 11 to battery O. The pressing inward of push button C closes a circuit including line coil $M^2$ of instrument A battery O', and pole-changers $d^2$ and $d^3$, which circuit is as follows:—from battery O' through wire 6, circuit controlling contact 53, wire 12, pole changing contact 25, wire 13, push button C of instrument A, wires 14 and 23, pole changing contact 26, wire 15, line coil $M^2$, wire 16, polarized indicator magnets 28, wire 17, pole changing contact 27, wire 18, neutral indicator magnets 29, wire 19, neutral indicator magnets 29 of instrument B, wire 20, push button C', wires 21 and 22, pole changing contact 24, wire 23, circuit controlling contact 52, wire 11 to battery O'. The fact that this last traced circuit is complete is indicated to the operator at A by the movement of a pointer controlled by neutral magnet 29 in the usual manner.

With the currents from the two batteries flowing in the directions traced above through coils M' and $M^2$, the armature 51 will be held up by magnet M, and a staff can then be removed from instrument A. The removal of the staff will in the usual manner cause a reversal of the position of the pole-changers D of this instrument, the pole-changing contacts then assuming the positions shown in Fig. 2. Current from battery O' at instrument B will then flow through coil $M^2$ and polarized magnets 28 of instrument A in the opposite direction to that just traced, hence the currents in the two coils M' and $M^2$ will be flowing in the same direction, thereby annulling the attractive power of magnet M. The armature 51 will then drop to its initial position, moving the contacts 52 and 53 of circuit controller P back to their initial position shown in solid lines in Fig. 1, thereby opening the circuit of local coil M'. The circuit of line coil $M^2$ is opened as push button C is released. The fact that a staff has been removed will be indicated by the pointer operated by the polarized magnet 28, the position of which pointer depends on the direction of flow of current through the magnet.

The circuits for the release of a staff from instrument B would be similar to those just traced for instrument A, hence they need not be traced in detail herein. In this case the line coil $M^2$ of instrument B is connected in a circuit including battery O and pole-changers $d'$ and $d^4$; and the local coil M' of instrument B is connected in circuit with battery O'.

Referring now particularly to Fig. 2, the solid lines indicate the positions occupied by the contacts of circuit controllers D and P after the removal of a staff from instrument A. If now an attempt should be made to remove a second staff from instrument A, by pressing push button C inwardly and by reversing the contacts of circuit controller P as indicated in dash lines, local coil M' of instrument A would be connected with battery O exactly as before, and line coil $M^2$ with battery O' through the following circuit—from battery O' through wire 6, circuit controlling contact 53, wire 12, pole-changing contact 25, wire 13, push button C of instrument A, wire 14, pole-changing contact 27, wire 17, polarized indicator magnets 28, wire 16, line coil $M^2$, wire 15, pole-changing contact 26, wire 18, neutral indicator magnets 29, wire 19, thence back to battery O' as traced hereinbefore. It will be noted that current from battery O' now passes through line coil $M^2$ in the direction opposite to that as hereinbefore traced, and that therefore current passes through the two coils M' and $M^2$ in the same direction. Magnet M will not hold up its armature and a staff cannot therefore be removed. If the attempt should be made to remove a staff from instrument B, the circuits would be similar to those just traced, hence they need not be traced in detail herein.

As will be clear from the foregoing explanation, the removal of a staff from either instrument will reverse the position of pole-changers D of that instrument, and this reversal will reverse the direction of flow of current through the line coil of both instruments. Hence upon a subsequent attempt to remove another staff from either of the instruments the direction of flow of current through the line coil will be such as to annul the holding power of magnet M and a release cannot be accomplished. When however the staff which was removed from one of the instruments is replaced in either one of the instruments, the pole-changers D or D' of that instrument will be reversed, thereby placing the pole-changers of the two instruments in corresponding positions, and the instruments will be in synchronism.

It will be clear from the foregoing explanation that in a staff system embodying my invention, the circuit of the line coil of each instrument is normally open only at the push button of the corresponding instrument. The circuit for the local coil of each instrument is of course controlled at the corresponding instrument. Hence both of these circuits for either instrument may be closed by an operator at the corresponding instrument without the coöperation of an operator at the other instrument. The system may therefore be operated by train or car crews if desired. It will be noted that I accomplish this mode of operation with the use of but three line wires extending between the two instruments.

Although I have shown and described only one staff system embodying my invention, it is understood that various modifications may be made therein within the scope of the appended claims without departing from the spirit and scope of my invention.

Having thus described my invention, what I claim is:

1. In combination, two staff instruments, a magnet in each instrument comprising a local coil and a line coil, a battery at each instrument, two pole-changers in each instrument, a circuit for the line coil of each instrument each of which circuits includes the battery at the other instrument and one pole-changer in each instrument, and a circuit for the local coil of each instrument each of which circuits includes the battery at the corresponding instrument, and means in each instrument actuated by the insertion of a staff in and also by the removal of a staff from the instrument for reversing the pole-changers of the instrument.

2. In combination, two staff instruments, a magnet in each instrument comprising a local coil and a line coil, a battery at each instrument, two pole-changers in each instrument, a circuit for the line coil of each instrument, each of which circuits includes two pole-changers one in each instrument, a circuit for the local coil of each instrument, and a circuit controller in each instrument for connecting the battery at such instrument with the circuit for the local coil of such instrument or with the circuit for the line coil of the other instrument, and means in each instrument actuated by the insertion of a staff in and also by the removal of a staff from the instrument for reversing the pole-changers of the instrument.

3. In combination, two staff instruments, a magnet in each instrument comprising a local coil and a line coil, a battery at each instrument, two pole-changers in each instrument, a circuit for the line coil of each instrument each of which circuits includes two pole-changers one in each instrument, a circuit for the local coil of each instrument, a circuit controller in each instrument for connecting the battery at that instrument with the circuit for the local coil of that instrument or with the circuit for the line coil of the other instrument, a second circuit controller in each instrument for opening and closing the circuit of the line coil in the corresponding instrument, and means in each instrument actuated by the insertion of a staff in and also by the removal of a staff from the instrument for reversing the pole-changers of the instrument.

4. In combination, two staff instruments, a magnet in each instrument comprising a local coil and a line coil, a battery at each instrument, two pole changers in each instrument, a circuit for the line coil of each instrument each of which circuits includes two pole-changers one in each instrument, a circuit for the local coil of each instrument, a circuit controller in each instrument for connecting the battery at such instrument with the circuit of the local coil of the corresponding instrument or with the circuit of the line coil of the other instrument, a circuit controller in each instrument for opening and closing the circuit of the line coil in the corresponding instrument, and a circuit controller in each instrument for opening and closing the circuit of the line coil in the other instrument, and means in each instrument actuated by the insertion of a staff in and also by the removal of a staff from the instrument for reversing the pole-changers of the instrument.

5. In combination, two staff instruments, a magnet in each instrument comprising a local coil and a line coil, a battery at each instrument, two pole changers in each instrument, a circuit for the line coil of each instrument each of which circuits includes two pole changers one in each instrument, a circuit for the local coil of each instrument, a circuit controller in each instrument for connecting the battery at such instrument with the circuit of the local coil of the corresponding instrument or with the circuit of the line coil of the other instrument, a push button for each instrument, and two circuit controllers operated thereby one of which controls the circuit of the line coil for the corresponding instrument and the other of which controls the circuit of the line coil for the other instrument, and means in each instrument actuated by the insertion of a staff in and also by the removal of a staff from the instrument for reversing the pole-changers of the instrument.

6. In combination, two staff instruments, a magnet in each instrument each of which comprises a local coil and a line coil, an armature for the magnet of each instrument, a battery at each instrument, two pole-changers in each instrument, a circuit for the line coil of each instrument each of which circuits includes two pole-changers one in each instrument, a circuit for the local coil of each instrument, circuit controllers one operatively connected with each armature and adapted to connect the battery at the corresponding instrument with the circuit for the local coil of the corresponding instrument or with the circuit for the line coil of the other instrument according to whether or not the armature is closed against the magnet, and means in each instrument actuated by the insertion of a staff in and also by the removal of a staff from the instrument for reversing the pole-changers of the instrument.

7. In combination, two staff-instruments, a magnet for each instrument comprising a line coil and a local coil, a battery at each instrument, two pole-changers in each instrument, three line wires extending between the two instruments one of which is a common wire, a circuit for the local coil of each instrument each of which circuits includes the battery at the corresponding instrument; a circuit for the line coil of each instrument each of which circuits includes the battery at the other instrument, and two pole-changers one in each instrument, one of which line coil circuits includes the common wire and one other line wire, and the other of which line coil circuits includes the common wire and the remaining line wire, and means in each instrument actuated by the insertion of a staff in and also by the removal of a staff from the instrument for reversing the pole-changers of the instrument.

8. In combination, two staff instruments, a magnet in each instrument comprising a local coil and a line coil, a battery at each instrument, two pole-changers in each instrument, a circuit for the line coil of each instrument each of which circuits includes the battery at the other instrument and one pole changer in each instrument, a circuit for the local coil of each instrument each of which circuits includes the battery at the corresponding instrument; a normally closed circuit controller in each instrument each of which is included in the circuit of the line coil for the other instrument, a normally open circuit controller in each instrument, each of which is included in the circuit of the line coil of the corresponding instrument whereby the circuit of each line coil can be closed at the corresponding instrument independently of the other instrument, and means in each instrument actuated by the insertion of a staff in and also by the removal of a staff from the instrument for reversing the pole-changers of the instrument.

9. In combination, two staff instruments, a magnet in each instrument comprising a local coil and a line coil, a battery and two pole-changers for each instrument, contacts and conductors for connecting the battery of each instrument with the local coil of that instrument or with the line coil of the other instrument, the circuit of each line coil including two pole-changers one in each instrument, and means actuated by the insertion of a staff in and also by the removal of a staff from each instrument for reversing both pole-changers of that instrument.

10. In combination, two staff instruments, a magnet in each instrument comprising a line coil, two pole-changers in each instrument, a battery at each instrument, a circuit for each line coil each including the battery at the other instrument and each including two pole-changers one in each instrument, and means actuated by the insertion of a staff in and also by the removal of a staff from each instrument for reversing both pole-changers of that instrument.

11. In combination, two staff instruments, a magnet in each instrument comprising a local coil and a line coil, a battery and two pole-changers for each instrument, contacts and conductors for connecting the battery at each instrument with the local coil of that instrument or with the line coil of the other instrument, the circuit of each line coil including two pole-changers one in each instrument, a circuit controller in each instrument for opening and closing the circuit of the line coil of the corresponding instrument, and means actuated by the insertion of a staff in and also by the removal of a staff from each instrument for reversing both pole-changers of that instrument.

12. In combination, two staff instruments, a magnet in each instrument comprising a local coil and a line coil, a battery and two pole-changers for each instrument, contacts and conductors for connecting the battery at each instrument with the local coil of that instrument or with the line coil of the other instrument, the circuit of each line coil including two pole-changers one in each instrument, a circuit controller in each instrument for opening and closing the circuit of the line coil of the corresponding instrument, a second circuit controller in each instrument for opening and closing the circuit of the line coil of the other instrument, and means actuated by the insertion of a staff in and also by the removal of a staff from each instrument for reversing both pole-changers of that instrument.

13. In combination, two staff instruments, a magnet in each instrument comprising a local coil and a line coil, a battery and two pole-changers for each instrument, contacts and conductors for connecting the battery at each instrument with the local coil of that instrument or with the line coil of the other instrument, the circuit of each line coil including two pole-changers one in each instrument, a push button for each instrument, two circuit controllers controlled by each button one of which controls the circuit of the line coil for the corresponding instrument and the other of which controls the circuit of the line coil for the other instrument, and means actuated by the insertion of a staff in and also by the removal of a staff from each instrument for reversing both pole-changers of that instrument.

14. In combination, two staff instruments, a magnet in each instrument comprising a local coil and a line coil, circuits for the coils, a battery and two pole-changers at each instrument, a circuit controller in each instrument each adapted when in normal position to connect the battery of its instrument with the circuit of the line coil of the other instrument and when in the reversed position to connect the battery of its instrument with the circuit of the local coil of its instrument, the circuit of each line coil including two pole-changers one in each instrument, a push button in each instrument, two contacts controlled by each button one of which is normally open and is included in circuit with the line coil of the corresponding instrument and the other of which is normally closed and is included in circuit with the line coil of the other instrument, and means actuated by the insertion of a staff in and also by the removal of a staff from either instrument for reversing both pole-changers of that instrument.

15. In combination, two staff instruments, a magnet in each instrument comprising a local coil and a line coil, circuits for the coils, an armature for each magnet, a battery and two pole-changers for each instrument, a circuit controller for each instrument each operatively connected with the armature of its instrument and each adapted to connect the battery of its instrument with the local coil of that instrument or with the line coil of the other instrument according to whether or not the armature is closed against its magnet, the circuit of each line coil including two pole-changers one in each instrument, and means actuated by the insertion of a staff in and also by the removal of a staff from each instrument for reversing both pole-changers of that instrument.

16. In combination, two staff instruments, a magnet in each instrument comprising a line coil, a battery at each instrument, three line wires extending between the two instruments one of which is a common wire, a circuit for each line coil each including the battery at the other instrument, one of the circuits comprising the common wire and one other line wire, and the other circuit comprising the common wire and the remaining line wire.

17. In combination, two staff instruments, a magnet in each instrument comprising a line coil, a battery at each instrument, three line wires extending between the two instruments one of which is a common wire, a circuit for each line coil each including the battery at the other instrument, one of the circuits comprising the common wire and one other line wire, and the other circuit comprising the common wire and the remaining line wire, and means in each instrument actuated by the insertion of a staff in and also by the removal of a staff from that instrument for reversing the polarity of the current in both line coils.

18. In combination, two staff instruments, a magnet in each instrument comprising a line coil, a battery and two pole-changers for each instrument, three line wires extending between the two instruments one of which is a common wire; a circuit for each line coil including the battery at the other instrument, the circuit for each line coil including two pole-changers one in each instrument, one of the circuits comprising the common wire and one other line wire, and the other circuit including the common wire and the remaining line wire, and means in each instrument actuated by the insertion of a staff in and also by the removal of a staff from that instrument for reversing both pole changers in that instrument.

19. In combination, two staff instruments, a magnet in each instrument comprising a local coil and a line coil, a battery at each instrument, three line wires extending between the two instruments one of which is a common wire, a circuit controller in each instrument for connecting the battery of that instrument with the local coil of that instrument or with the line coil of the other instrument, the circuit of one line coil including the common wire and one other line wire, and the circuit for the other line coil including the common wire and the remaining line wire, and means in each instrument actuated by the insertion of a staff in and also by the withdrawal of a staff from that instrument for reversing the polarity of the current in the line coil of both instruments.

20. In combination, two staff instruments, a magnet in each instrument comprising a local coil and a line coil, two pole-changers in each instrument, a battery at each instrument, three line wires extending between the two instruments one of which is a common wire, a circuit controller in each instrument for connecting the battery of that instrument with the local coil of that instrument or with the line coil of the other instrument, the circuit of each line coil including two pole-changers one in each instrument, the circuit of one line coil including the common wire and one other line wire, and the circuit for the other line coil including the common wire and the remaining line wire, and means in each instrument actuated by the insertion of a staff in and also by the removal of a staff from that instrument for reversing both pole-changers in that instrument.

21. In combination, two staff instruments, a magnet in each instrument comprising a local coil and a line coil, a battery and two pole-changers for each instrument, means for connecting the battery of each instrument with the local coil of that instrument or with the line coil of the other instrument, the circuit of each line coil including two pole-changers one in each instrument, and means actuated by the insertion of a staff in and also by the removal of a staff from each instrument for reversing both pole-changers of that instrument.

22. In combination, two staff instruments, a magnet in each instrument comprising a local coil and a line coil, a battery and two pole-changers for each instrument, and contacts and conductors for connecting the battery at each instrument with the local coil of that instrument or with the line coil of the other instrument, the circuit for each line coil including two pole-changers one in each instrument.

In testimony whereof I affix my signature in presence of two witnesses.

THOMAS H. PATENALL.

Witnesses:
F. J. PILLSBURY,
A. L. VENCILL.

---

Copies of this patent may be obtained for five cents each, by addressing the "Commissioner of Patents, Washington, D. C."